(12) United States Patent
Sakaue

(10) Patent No.: US 7,982,906 B2
(45) Date of Patent: Jul. 19, 2011

(54) OPTICAL SCANNING DEVICE, IMAGE DISPLAY DEVICE AND RETINAL SCANNING DISPLAY

(75) Inventor: Osamu Sakaue, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 505 days.

(21) Appl. No.: 12/289,082

(22) Filed: Oct. 20, 2008

(65) Prior Publication Data

US 2009/0059325 A1 Mar. 5, 2009

Related U.S. Application Data

(63) Continuation-in-part of application No. PCT/JP2007/057039, filed on Mar. 30, 2007.

(30) Foreign Application Priority Data

Apr. 18, 2006 (JP) ................................. 2006-114713

(51) Int. Cl.
*H04N 1/053* (2006.01)
*G06F 1/08* (2006.01)
(52) U.S. Cl. .... 358/1.7; 358/513; 359/199.1; 359/212.1
(58) Field of Classification Search .................. 358/1.7, 358/513; 359/199.1, 199.4, 204.1, 212.1, 359/216.1, 223.1, 226.1; 345/698
See application file for complete search history.

(56) References Cited

U.S. PATENT DOCUMENTS

| | | | |
|---|---|---|---|
| 4,760,251 A | | 7/1988 | Shimada et al. |
| 5,877,886 A | * | 3/1999 | Ishii et al. .................. 359/212.1 |
| 6,140,979 A | | 10/2000 | Gerhard et al. |
| 7,327,379 B2 | * | 2/2008 | Nihei et al. .................... 347/247 |
| 7,511,868 B2 | * | 3/2009 | Nakajima .................. 359/204.1 |
| 2003/0067533 A1 | | 4/2003 | Omori et al. |
| 2003/0156184 A1 | | 8/2003 | Suzuki et al. |
| 2005/0146596 A1 | * | 7/2005 | Nihei et al. .................... 347/239 |
| 2007/0058232 A1 | * | 3/2007 | Nakajima ..................... 359/205 |
| 2008/0012933 A1 | * | 1/2008 | Nihei et al. .................... 347/239 |
| 2009/0315925 A1 | * | 12/2009 | Tanaka .......................... 345/698 |
| 2010/0046053 A1 | * | 2/2010 | Saito ........................ 359/199.4 |

FOREIGN PATENT DOCUMENTS

| | | |
|---|---|---|
| GB | 2 333 385 A | 7/1999 |
| JP | U 60-36621 | 3/1985 |
| JP | B2 5-3947 | 1/1993 |
| JP | A 7-92407 | 4/1995 |
| JP | A 7-191271 | 7/1995 |
| JP | A 8-286132 | 11/1996 |
| JP | A 2003-25629 | 1/2003 |
| JP | A-2003-57586 | 2/2003 |
| JP | A 2003-103830 | 4/2003 |
| JP | A 2003-185953 | 7/2003 |
| JP | A 2003-329952 | 11/2003 |
| JP | A 2005-181477 | 7/2005 |
| JP | A 2001-21829 | 1/2006 |
| WO | WO 2005/059624 A1 | 6/2005 |
| WO | WO 2005/121866 A1 | 12/2005 |

\* cited by examiner

*Primary Examiner* — Kimberly A Williams
(74) *Attorney, Agent, or Firm* — Oliff & Berridge, PLC

(57) ABSTRACT

An optical scanning device is constituted without using any arc sin .theta. correction lens, while maintaining quality of an image. The optical scanning device comprises an optical flux generator, a resonance-type deflection element, a drive signal generator and a dot clock generator that is configured to sequentially generate dot clocks which satisfy a first, second and third condition, wherein the optical flux generator radiates the optical fluxes having brightnesses corresponding to the clock cycles of the dot clocks generated by the dot clock generator.

13 Claims, 9 Drawing Sheets

Fig. 5
CLOCK TABLE

| DOT CLOCK NUMBER | NUMBER OF MASTER CLOCKS | DOT CLOCK NUMBER | NUMBER OF MASTER CLOCKS |
|---|---|---|---|
| 1 | 6 | 31 | 3 |
| 2 | 5 | 32 | 4 |
| 3 | 6 | 33 | 3 |
| 4 | 5 | 34 | 4 |
| 5 | 4 | 35 | 3 |
| 6 | 5 | 36 | 4 |
| 7 | 4 | 37 | 3 |
| 8 | 5 | 38 | 4 |
| 9 | 4 | 39 | 3 |
| 10 | 4 | 40 | 4 |
| 11 | 4 | 41 | 3 |
| 12 | 4 | 42 | 4 |
| 13 | 4 | 43 | 3 |
| 14 | 4 | 44 | 4 |
| 15 | 4 | 45 | 4 |
| 16 | 3 | 46 | 3 |
| 17 | 4 | 47 | 4 |
| 18 | 4 | 48 | 4 |
| 19 | 3 | 49 | 4 |
| 20 | 4 | 50 | 4 |
| 21 | 3 | 51 | 4 |
| 22 | 4 | 52 | 4 |
| 23 | 3 | 53 | 5 |
| 24 | 4 | 54 | 4 |
| 25 | 3 | 55 | 5 |
| 26 | 4 | 56 | 5 |
| 27 | 3 | 57 | 5 |
| 28 | 3 | 58 | 5 |
| 29 | 4 | 59 | 5 |
| 30 | 3 | 60 | 6 |

(b) PERIODS OF DOT CLOCK NUMBERS 31 TO 37

(a) PERIODS OF DOT CLOCK NUMBERS 1 TO 5

Fig. 7

| DOT CLOCK NUMBER | AMPLITUDE % | OSCILLATION ANGLE rad | SPEED | 1/SPEED | THEORETICAL VALUE | | CORRECTED VALUE | |
|---|---|---|---|---|---|---|---|---|
| | | | | | NUMBER OF DOTS | CUMULATIVE VALUE | NUMBER OF DOTS | CUMULATIVE VALUE |
| 1 | 80.9 | 0.942 | 0.588 | 1.701 | 5.8 | 5.8 | 6 | 6 |
| 2 | 78.2 | 0.897 | 0.624 | 1.603 | 5.5 | 11.3 | 5 | 11 |
| 3 | 75.4 | 0.854 | 0.657 | 1.523 | 5.2 | 16.5 | 6 | 17 |
| 4 | 72.7 | 0.814 | 0.687 | 1.456 | 5.0 | 21.5 | 5 | 22 |
| 5 | 69.9 | 0.774 | 0.715 | 1.399 | 4.8 | 26.3 | 4 | 26 |
| 6 | 67.2 | 0.737 | 0.741 | 1.350 | 4.6 | 30.9 | 5 | 31 |
| 7 | 64.4 | 0.700 | 0.765 | 1.308 | 4.5 | 35.4 | 4 | 35 |
| 8 | 61.7 | 0.665 | 0.787 | 1.271 | 4.3 | 39.7 | 5 | 40 |
| 9 | 59.0 | 0.631 | 0.808 | 1.238 | 4.2 | 43.9 | 4 | 44 |
| 10 | 56.2 | 0.597 | 0.827 | 1.209 | 4.1 | 48.0 | 4 | 48 |
| 11 | 53.5 | 0.564 | 0.845 | 1.183 | 4.0 | 52.0 | 4 | 52 |
| 12 | 50.7 | 0.532 | 0.862 | 1.160 | 4.0 | 56.0 | 4 | 56 |
| 13 | 48.7 | 0.501 | 0.877 | 1.140 | 3.9 | 59.9 | 4 | 60 |
| 14 | 45.3 | 0.470 | 0.892 | 1.121 | 3.8 | 63.7 | 4 | 64 |
| 15 | 42.5 | 0.439 | 0.905 | 1.105 | 3.8 | 67.5 | 4 | 68 |
| 16 | 39.8 | 0.409 | 0.918 | 1.090 | 3.7 | 71.2 | 3 | 71 |
| 17 | 37.0 | 0.379 | 0.929 | 1.076 | 3.7 | 74.9 | 4 | 75 |
| 18 | 34.3 | 0.350 | 0.939 | 1.065 | 3.6 | 78.5 | 4 | 79 |
| 19 | 31.5 | 0.321 | 0.949 | 1.054 | 3.6 | 82.1 | 3 | 82 |
| 20 | 28.8 | 0.292 | 0.958 | 1.044 | 3.6 | 85.7 | 4 | 86 |
| 21 | 26.1 | 0.264 | 0.965 | 1.036 | 3.5 | 89.2 | 3 | 89 |
| 22 | 23.3 | 0.235 | 0.972 | 1.028 | 3.5 | 92.7 | 4 | 93 |
| 23 | 20.6 | 0.207 | 0.979 | 1.022 | 3.5 | 96.2 | 3 | 96 |
| 24 | 17.8 | 0.179 | 0.984 | 1.016 | 3.5 | 99.7 | 4 | 100 |
| 25 | 15.1 | 0.151 | 0.989 | 1.012 | 3.4 | 103.1 | 3 | 103 |
| 26 | 12.3 | 0.124 | 0.992 | 1.008 | 3.4 | 106.5 | 4 | 107 |
| 27 | 9.6 | 0.096 | 0.995 | 1.005 | 3.4 | 109.9 | 3 | 110 |
| 28 | 6.9 | 0.069 | 0.998 | 1.002 | 3.4 | 113.3 | 3 | 113 |
| 29 | 4.1 | 0.041 | 0.999 | 1.001 | 3.4 | 116.7 | 4 | 117 |
| 30 | 1.4 | 0.014 | 1.000 | 1.000 | 3.4 | 120.1 | 3 | 120 |

Fig. 8

LOOK-UP TABLE
(BRIGHTNESS TABLE)

| DOT CLOCK NUMBER | BRIGHTNESS CORRECTION RATE | DOT CLOCK NUMBER | BRIGHTNESS CORRECTION RATE |
|---|---|---|---|
| 1 | 1.000 | 31 | 1.701 |
| 2 | 1.001 | 32 | 1.603 |
| 3 | 1.002 | 33 | 1.523 |
| 4 | 1.005 | 34 | 1.456 |
| 5 | 1.008 | 35 | 1.399 |
| 6 | 1.012 | 36 | 1.35 |
| 7 | 1.016 | 37 | 1.308 |
| 8 | 1.022 | 38 | 1.271 |
| 9 | 1.028 | 39 | 1.238 |
| 10 | 1.036 | 40 | 1.209 |
| 11 | 1.044 | 41 | 1.183 |
| 12 | 1.054 | 42 | 1.16 |
| 13 | 1.065 | 43 | 1.14 |
| 14 | 1.076 | 44 | 1.121 |
| 15 | 1.090 | 45 | 1.105 |
| 16 | 1.105 | 46 | 1.09 |
| 17 | 1.121 | 47 | 1.076 |
| 18 | 1.140 | 48 | 1.065 |
| 19 | 1.160 | 49 | 1.054 |
| 20 | 1.183 | 50 | 1.044 |
| 21 | 1.209 | 51 | 1.036 |
| 22 | 1.238 | 52 | 1.028 |
| 23 | 1.271 | 53 | 1.022 |
| 24 | 1.308 | 54 | 1.016 |
| 25 | 1.350 | 55 | 1.012 |
| 26 | 1.399 | 56 | 1.008 |
| 27 | 1.456 | 57 | 1.005 |
| 28 | 1.523 | 58 | 1.002 |
| 29 | 1.603 | 59 | 1.001 |
| 30 | 1.701 | 60 | 1 |

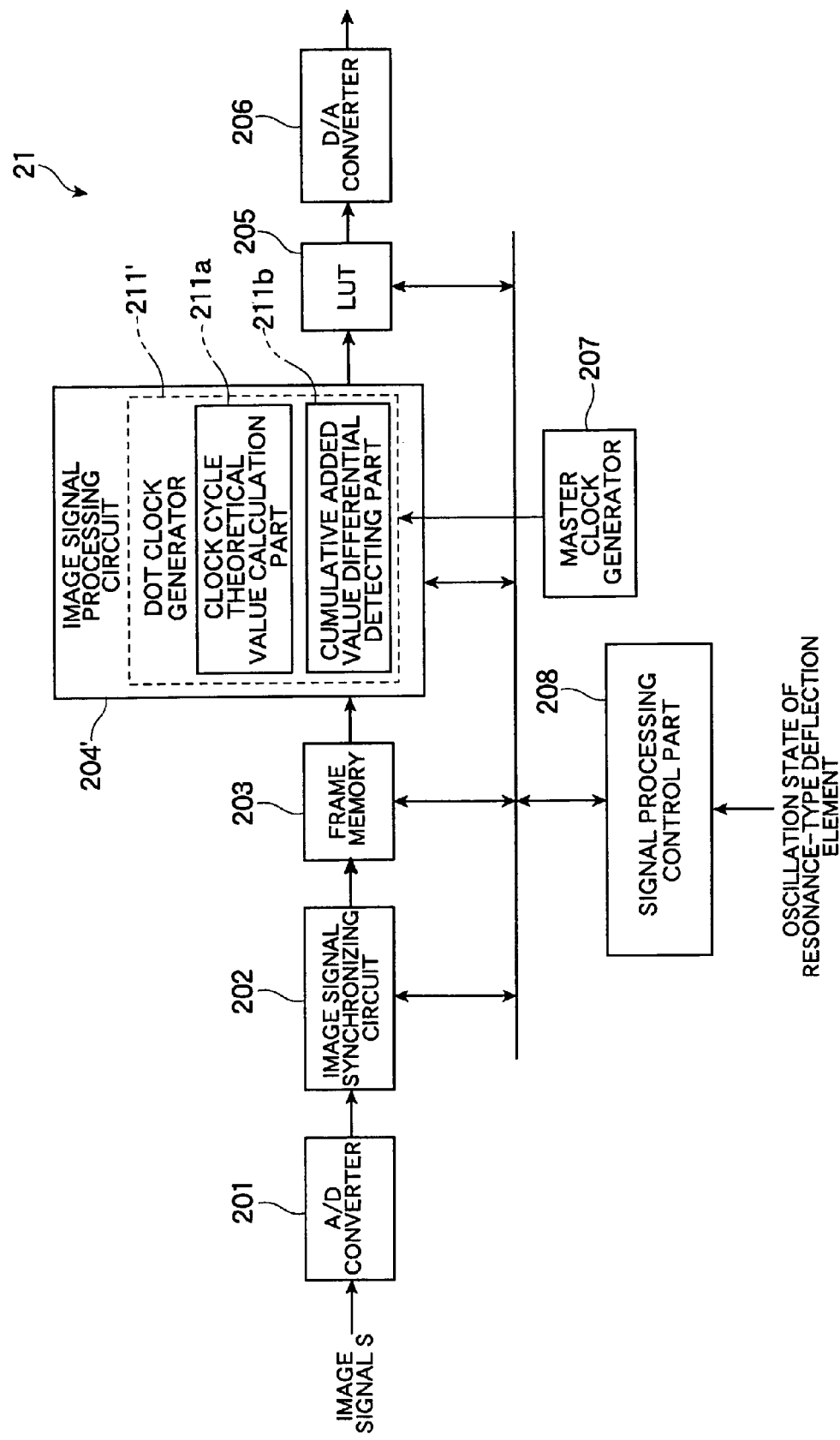

OPTICAL SCANNING DEVICE, IMAGE DISPLAY DEVICE AND RETINAL SCANNING DISPLAY

CROSS-REFERENCE TO RELATED APPLICATIONS

The present application is a Continuation-in-Part of International Application PCT/JP2007/057039 filed on Mar. 30, 2007, which claims the benefits of Japanese Patent Application No. 2006-114713 filed on Apr. 18, 2006.

BACKGROUND OF THE INVENTION

1. Field of the Invention

The present invention relates to an optical scanning device, and more particularly to an optical scanning device which scans a radiated optical flux by making use of a predetermined oscillation of a resonance-type deflection element, and an image display device and a retinal scanning display which include such an optical scanning device.

2. Description of the Related Art

With respect to an optical scanning device which has been used as a laser printer device, an image display device or the like conventionally, there has been known an optical scanning device which uses a resonance-type deflection element capable of scanning an optical flux by making use of oscillation.

For example, JP-A-2005-181477 (patent document 1) discloses an image display device which includes an optical scanning device capable of performing scanning on an optical flux radiated from a light source in the high-speed scanning direction (horizontal direction) using the resonance-type deflection element. The optical flux scanned by the resonance-type deflection element is scanned by a deflection element arranged in a succeeding stage in the low-speed scanning direction (vertical direction), and is projected on a retina of an eye thus forming an image on a retina.

Here, it is necessary for this type of optical scanning device to scan optical fluxes such that positions of the optical fluxes corresponding to respective pixels (dots) in the scanning direction of the optical fluxes are arranged at equal intervals. However, when the resonance-type deflection element is used, in radiating the optical fluxes corresponding to the respective pixels at equal intervals from the light source, after scanning the optical fluxes corresponding to the respective pixels using the resonance-type deflection element, the positions of the optical fluxes corresponding to the respective pixels in the scanning direction of the optical fluxes are arranged at non-equal intervals in a sinusoidal shape. In this specification, hereinafter, the explanation will be made on a premise that the pixel implies a minimum unit of an image signal, and particularly implies a minimum unit of a digitalized image signal. That is, a component of the image signal which is read corresponding to each dot is explained as the pixel (pixel signal).

In view of the above, the optical fluxes corresponding to the respective pixels which are arranged at non-equal intervals by scanning using the resonance-type deflection element are optically corrected by an arc sin θ correction lens. However, the conventional optical correction using the arc sin θ correction lens requires an expensive optical system thus pushing up a cost.

To cope with such a drawback, there has been known a method which constitutes an optical scanning device without using the arc sin θ correction lens. That is, this method sets clocks for pixel scanning (dot clocks) to cycles corresponding to the optical scanning directions.

JP-B-5-3947 (Patent document 2) discloses an optical scanning device which includes an oscillator which generates reference clocks, and a first frequency divider which generates position control clocks by dividing the reference clocks, wherein dot clocks are generated based on the position control clocks, and the dot clocks are changed corresponding to scanning speeds of a resonance-type deflection element.

SUMMARY OF THE INVENTION

In the optical scanning device disclosed in patent document 2, since the dot clocks are changed corresponding to the scanning speeds of the resonance-type deflection element, the optical fluxes are scanned such that the scanning directions of the respective pixels are arranged at equal intervals. However, in the optical scanning device disclosed in patent document 2, the intensities of optical fluxes radiated for respective pixels in response to the dot clocks are not changed resulting in the occurrence of brightness irregularities of the scanned optical fluxes.

Accordingly, it is an object of the present invention to provide an optical scanning device which can be constituted without using an arc sin θ correction lens and can maintain quality of an image, and an image display device and a retinal scanning display which include such an optical scanning device.

To achieve the above-mentioned object, according to one aspect of the present invention, there is provided an optical scanning device which includes: an optical flux generator which generates an optical flux in response to an image signal read for every dot clock and radiates the optical flux; a resonance-type deflection element which has a deflection surface for scanning the optical flux; and a drive signal generator which generates a drive signal for oscillating the resonance-type deflection element in a resonance state, wherein the optical scanning device further includes a dot clock generator which generates dot clocks having clock cycles corresponding to the scanning directions of the optical flux by dividing master clocks which constitutes basic clocks, the dot clock generator is configured to sequentially generate the dot clocks which satisfy a first condition that the clock cycle of the actually-used dot clock corresponding to the scanning direction of the optical flux exhibits an error equal to or less than 1 cycle of the master clock with respect to the clock cycle of the dot clock which constitutes a theoretical value such that optical fluxes corresponding to the respective dots are arranged at equal intervals, a second condition that the cycle differences between the clock cycle of the actually-used dot clock corresponding to the scanning direction of the optical flux and the clock cycles of the preceding and succeeding dot clocks become errors equal to or less than 1 cycle of the master clock, and a third condition that an error between the number of the master clocks which is acquired by cumulatively adding the dot clocks from the dot clock corresponding to a scanning start position of the optical flux to the dot clock to be generated and the number of the master clocks which constitutes a theoretical value and is acquired by cumulatively adding dot clocks which constitute the theoretical values corresponding to the dot clocks from the dot clock corresponding to the scanning start position of the optical flux to the dot clock to be generated becomes equal to or less than 1 cycle of the master clock, and the optical flux generator radiates an optical fluxes having brightnesses corresponding to the clock cycles of the dot clocks generated by the dot clock generator.

Further, the above-mentioned optical scanning device of the present invention is applicable to an image display device which displays an image by scanning an optical flux modulated in response to an image signal using the optical scanning device.

Further, the above-mentioned optical scanning device of the present invention is applicable to a retinal scanning display which displays an image on a retina of an eye by projection by scanning an optical flux modulated in response to an image signal using the optical scanning device.

To achieve the above-mentioned object, according to another aspect of the present invention, there is provided a method of generating an optical flux in an optical scanning device which includes an optical flux generator which generates an optical flux in response to an image signal read for every dot clock and radiates the optical flux; a resonance-type deflection element which has a deflection surface for scanning the optical flux; and a drive signal generator which generates a drive signal for oscillating the resonance-type deflection element in a resonance state, the method of generating the optical flux comprising steps of: generating dot clocks having clock cycles corresponding to the scanning directions of the optical fluxes by dividing master clocks which constitute basic clocks; sequentially generating the dot clocks which satisfy a first condition that the clock cycle of the actually-used dot clock corresponding to the scanning direction of the optical flux exhibits an error equal to or less than 1 cycle of the master clock with respect to the clock cycle of the dot clock which constitutes a theoretical value such that optical fluxes corresponding to the respective dots are arranged at equal intervals, a second condition that the cycle differences between the clock cycle of the actually-used dot clock corresponding to the scanning direction of the optical flux and the clock cycles of the preceding and succeeding dot clocks become errors equal to or less than 1 cycle of the master clock, and a third condition that an error between the number of the master clocks which is acquired by cumulatively adding the dot clocks from the dot clock corresponding to a scanning start position of the optical flux to the dot clock to be generated and the number of the master clocks which constitutes a theoretical value and is acquired by cumulatively adding dot clocks which constitute the theoretical values corresponding to the dot clocks from the dot clock corresponding to the scanning start position of the optical flux to the dot clock to be generated becomes equal to or less than 1 cycle of the master clock; and radiating an optical flux having brightness corresponding to the clock cycle of the generated dot clock.

BRIEF DESCRIPTION OF THE DRAWINGS

FIG. 5 is a view showing an example of a clock table;

FIG. 7 is a view for explaining a method for forming the clock table;

FIG. 8 is a view showing an example of a lookup table; and

FIG. 9 is a view showing the constitution of a portion of a signal processing circuit according to a second embodiment.

DESCRIPTION OF THE PREFERRED EMBODIMENTS

Hereinafter, the best mode of the embodiments according to the present invention is explained in conjunction with drawings. Here, the embodiments which will be explained heretofore are embodiments of a case in which the present invention is applied to an image display device.

First Embodiment

[1. Explanation of Whole Image Display Device 1]

Figure 1:
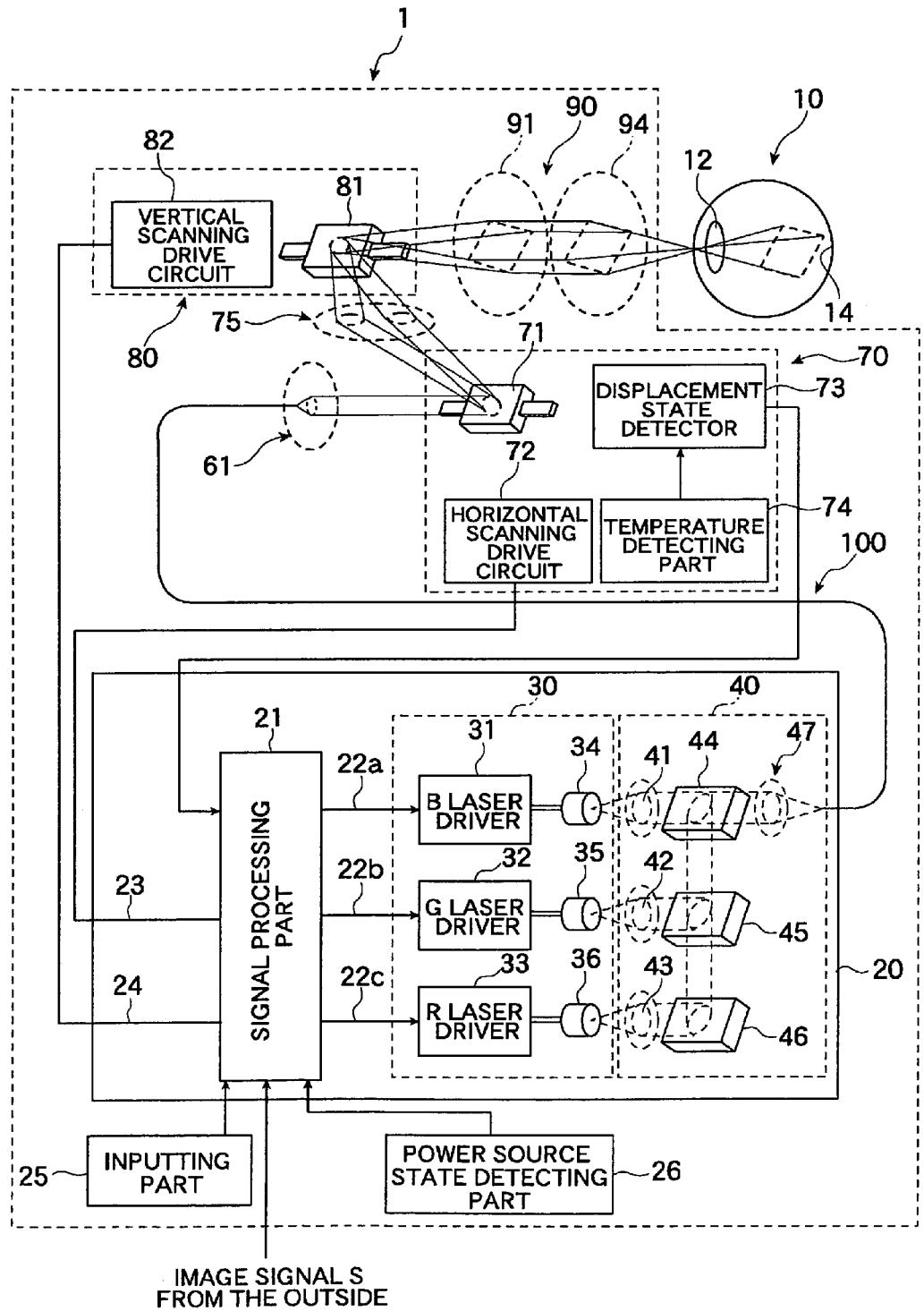
FIG. 1 is a view showing the whole constitution of an image display device according to a first embodiment.

First of all, the whole constitution of an image display device 1 and the manner of operation of the image display device 1 are explained. FIG. 1 shows the whole constitution of the image display device 1 of the embodiment according to the present invention. The image display device 1 is configured such that an optical flux is made incident on a pupil 12 of a viewer which is a user of the image display device 1 so as to project an image on his/her retina 14 thus allowing the viewer to visually recognize a virtual image in front of the pupil 12 of a viewer's eye 10. This device is also referred to as a retina-image-scanning-type display device.

The image display device 1 includes an optical flux generator 20 which reads an image signal S supplied from the outside for every dot clock, generates an optical flux whose intensity is modulated based on the read image signal and radiates the optical flux. Further, the image display device 1 includes, between the optical flux generator 20 and the viewer's eye 10, a collimation optical system 61 which collimates laser beams (hereinafter, referred to as "optical flux") generated by the optical flux generator 20 and radiated via an optical fiber 100, a horizontal scanning part 70 which scans the optical flux collimated by the collimation optical system 61 in a horizontal direction (primary direction) for image display, a vertical scanning part 80 which scans the optical flux scanned in the horizontal direction using the horizontal scanning part 70 in the vertical direction (secondary direction), a relay optical system 75 which is formed between the horizontal scanning part 70 and the vertical scanning part 80, and a relay optical system 90 which radiates the optical fluxes scanned in the horizontal direction as well as in the vertical direction in this manner (hereinafter, referred to as "scanned optical flux") on the pupil 12.

Further, the image display device 1 includes an inputting part 25 as a table changeover unit for changing over a clock table 210 and a lookup table 205 which are described later and a power source state detecting part 26 which detects a power source state of the optical flux generation part 20 described later. Here, the inputting part 25 is constituted of a table change over button or the like.

As shown in FIG. 1, the optical flux generating part 20 includes a signal processing circuit 21 to which an image signal S supplied from the outside is inputted and which generates respective signals or the like constituting components for synthesizing an image in response to the image signal S. In the signal processing circuit 21, respective image signals 22a to 22c of blue (B), green (G) and red (R) are generated and are outputted. Further, the signal processing circuit 21 outputs a horizontal synchronizing signal 23 used in the horizontal scanning part 70 and a vertical synchronizing signal 24 used in the vertical scanning part 80 respectively.

Further, the optical flux generating part 20 includes a light source part 30 for forming three image signals (B, R, G) 22a to 22c outputted from the signal processing circuit 21 for every dot clock into optical fluxes respectively, and an optical synthesizing part 40 for generating an arbitrary optical flux by combining these three optical fluxes into one optical flux.

The light source part 30 includes a B laser 34 for generating a blue optical flux and a B laser driver 31 for driving the B laser 34, a G laser 35 for generating a green optical flux and a G laser driver 32 for driving the G laser 35 and an R laser 36 for generating a red optical flux and an R laser driver 33 for driving the R laser 36. Here, the respective lasers 34, 35, 36 may be constituted of a semiconductor laser or a solid-state laser with a harmonics generation mechanism, for example. Here, when the respective lasers are formed of the semiconductor laser, it is necessary to perform the modulation of the intensity of the optical flux by providing an external modulator for every laser.

The optical synthesizing part 40 includes collimation optical systems 41, 42, 43 provided for collimating the optical fluxes incident from the light source part 30, dichroic mirrors 44, 45, 46 provided for synthesizing the collimated optical fluxes, and a coupling optical system 47 for guiding a synthesized optical flux to the optical fiber 100.

The laser beams radiated from the respective lasers 34, 35, 36 are, after respectively being collimated by the collimation optical systems 41, 42, 43, incident on the dichroic mirrors 44, 45, 46. Thereafter, using these dichroic mirrors 44, 45, 46, the respective optical fluxes are reflected on the dichroic mirrors 44, 45, 46 or are allowed to pass through the dichroic mirrors 44, 45, 46 selectively with respect to wavelengths thereof.

To be specific, the blue optical flux radiated from the B laser 34 is, after being collimated by the collimation optical system 41, incident on the dichroic mirror 44. The green optical flux radiated from the G laser 35 is incident on the dichroic mirror 45 via the collimation optical system 42. The red optical flux radiated from the R laser 36 is incident on the dichroic mirror 46 via the collimation optical system 43.

The optical fluxes of three primary colors which are respectively incident on these three dichroic mirrors 44, 45, 46 are reflected on the dichroic mirrors 44, 45, 46 or are allowed to pass through the dichroic mirrors 44, 45, 46 selectively corresponding to wavelengths thereof, and arrive at the coupling optical system 47, and are converged by the coupling optical system 47. Then, the converged optical fluxes are outputted to the optical fiber 100.

The horizontal scanning part 70 and the vertical scanning part 80, to bring the optical fluxes incident from the optical fiber 100 into a state which allows the optical fluxes to be projected as an image, scan the optical fluxes in the horizontal direction as well as in the vertical direction to form the optical fluxes into scanned optical fluxes.

The horizontal scanning part 70 includes a resonance-type deflection element 71 having a deflection surface for scanning the optical fluxes in the horizontal direction, a horizontal scanning drive circuit 72 as a drive signal generator which generates a drive signal for allowing the resonance-type deflection element 71 to resonate so as to oscillate deflection surface of the resonance-type deflection element 71, an oscillation state detector 73 which detects the oscillation state such as the oscillation range and oscillation frequency of the deflection surface of the resonance-type deflection element 71 in response to a displacement signal outputted from the resonance-type deflection element 71, and a temperature detecting part 74 which detects the temperature of the resonance-type deflection element 71. Here, although the temperature detecting part 74 detects the temperature of the resonance-type deflection element 71, the temperature of the resonance-type deflection element may be detected by detecting the temperature of the periphery of the resonance-type deflection element. Further, the horizontal scanning part 70, the optical flux generator 20, the optical fiber 100 and the collimation optical system 61 correspond to one example of the optical scanning device.

The vertical scanning part 80 includes a deflection element 81 for scanning the optical fluxes in the vertical direction, and a vertical scanning drive circuit 82 which drives the deflection element 81.

Here, the horizontal scanning drive circuit 72 and the vertical scanning drive circuit 82 respectively drive the resonance-type deflection element 71 and the deflection element 81 in response to a horizontal synchronizing signal 23 and a vertical synchronizing signal 24 which are outputted from the signal processing circuit 21.

Further, the image display device 1 includes a relay optical system 75 which relays the optical fluxes between the horizontal scanning part 70 and the vertical scanning part 80. Light which is scanned in the horizontal direction using the resonance-type deflection element 71 passes through the relay optical system 75 and is scanned by the deflection element 81 in the vertical direction, and is radiated to the relay optical system 90 as the scanned optical fluxes.

The relay optical system 90 includes lens systems 91, 94 having a positive refracting power. The scanned optical fluxes for display radiated from the vertical scanning part 80, using the lens system 91, have center lines thereof respectively arranged parallel to each other and are respectively converted into converged optical fluxes. Then, using the lens system 94, the converged optical fluxes are arranged substantially parallel to each other and, at the same time, are converted such that the center lines of these optical fluxes are converged on the pupil 12 of the viewer.

Here, in this embodiment, the optical flux incident from the optical fiber 100 is scanned in the horizontal direction by the horizontal scanning part 70 and, thereafter, is scanned in the vertical direction by the vertical scanning part 80. However, the arrangement of the horizontal scanning part 70 and the arrangement of the vertical scanning part 80 may be exchanged, and the optical flux may be scanned in the vertical direction by the vertical scanning part 80 and, thereafter, may be scanned in the horizontal direction by the horizontal scanning part 70.

[2. Explanation of Resonance-Type Deflection Element 71]

Figure 2:
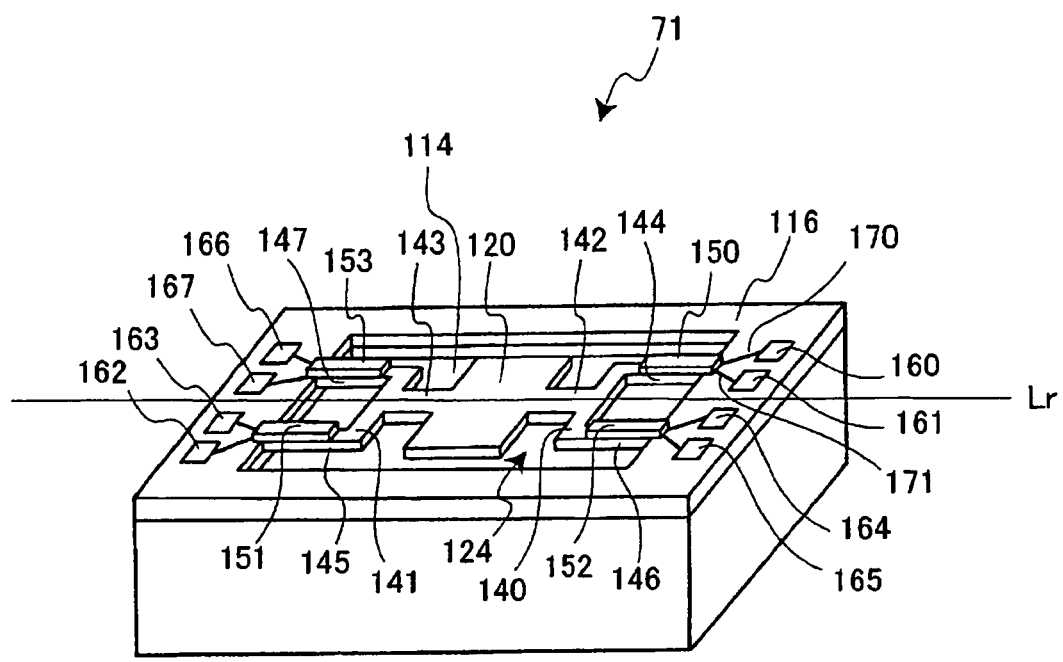
FIG. 2 is a perspective view showing an assembling state of a resonance-type deflection element shown in FIG. 1.

Next, the constitution of the resonance-type deflection element 71 for scanning the optical flux in the horizontal direction as described above is specifically explained hereinafter. FIG. 2 is a perspective view showing an appearance of the resonance-type deflection element 71.

The resonance-type deflection element 71 is an optical scanner of a resonance type. For scanning the light spot on the retina 14 in the horizontal direction, the resonance-type deflection element 71 oscillates an oscillating body 124 which includes a deflection surface 120 which constitutes a reflection mirror for changing the radiation direction of the optical flux about an oscillation axis Lr extending in the lateral direction in FIG. 2 by reflecting the optical flux. In this embodiment, the oscillating body 124 is allowed to resonate. Due to such resonation of the oscillating body 124, it is possible to oscillate the deflection surface 120.

The oscillating body 124 is integrally formed of a plurality of constitutional elements. That is, the oscillating body 124 is formed of the deflection surface 120, a first beam portion 140 which is connected to one side of the deflection surface 120 and is formed of a plate-like resilient member 142, resilient member 144 and resilient member 146, and a second beam portion 141 which is connected to the other side of the deflection surface 120 and is formed of a plate-like resilient member 143, and resilient member 145 and resilient member 147.

A first piezoelectric element 150 and a second piezoelectric element 152 are respectively fixedly secured to one-side surfaces of the resilient members 144,146 which form portions of the first beam portion 140. The first piezoelectric element 150 and the second piezoelectric element 152 respectively have one ends thereof fixedly secured to the fixed frame body 116 as fixed ends, and another ends thereof formed as free ends which are not fixedly secured to the fixed frame body 116. Here, a first piezoelectric element portion is constituted of the first piezoelectric element 150 and the second piezoelectric element 152.

The first piezoelectric element 150 and the second piezoelectric element 152 have the same structure in which a piezoelectric body is sandwiched by an upper electrode and a lower electrode in the direction perpendicular to fixed surfaces of the first piezoelectric element 150 and the second piezoelectric element 152. Further, the upper electrode and the lower electrode of the first piezoelectric element 150 are respectively connected to an input terminal 160 and an input terminal 161 which are mounted on the fixed frame body 116 using lead lines 170, 171. The upper electrode and the lower electrode of the second piezoelectric element 152 are respectively connected to an input terminal 164 and an input terminal 165 which are mounted on the fixed frame body 116 respectively using lead lines.

In the resonance-type deflection element 71 having the above-mentioned constitution, by applying AC voltages of phases opposite to each other between the upper electrode and the lower electrode of the first piezoelectric element 150 and the upper electrode and the lower electrode of the second piezoelectric element 152, respective free ends of the first piezoelectric element 150 and the second piezoelectric element 152 are resiliently deformed and is bent thus repeating vertical bending oscillation at AC voltage frequency number. The bending oscillation is, by way of the first beam portion 140, converted into a rotational movement about the oscillation axis Lr which constitutes the center axis, and the deflection surface 120 is, as shown in FIG. 3, rotated about the oscillation axis Lr.

Further, the second beam portion 141 is positioned on the other side of the deflection surface 120 as described above and is formed symmetrically with the first beam portion 140 with respect to the oscillation axis Lr, and the rotational oscillations generated by the first beam portion 140 as described above are transmitted to the second beam portion 141 by way of the deflection surface 120. As a result, the displacements similar to the displacements of the second beam portion 141 are generated. That is, about the oscillation axis Lr which constitutes the center axis, the resilient member 143 is resiliently deformed and is rotationally oscillated in the approximately same manner as the resilient member 142, and the resilient member 145 is resiliently deformed and generates the bending oscillations in the approximately same manner as the resilient member 146, and the resilient member 147 is resiliently deformed and generates the bending oscillations in the approximately same manner as the resilient member 144.

Figure 3:
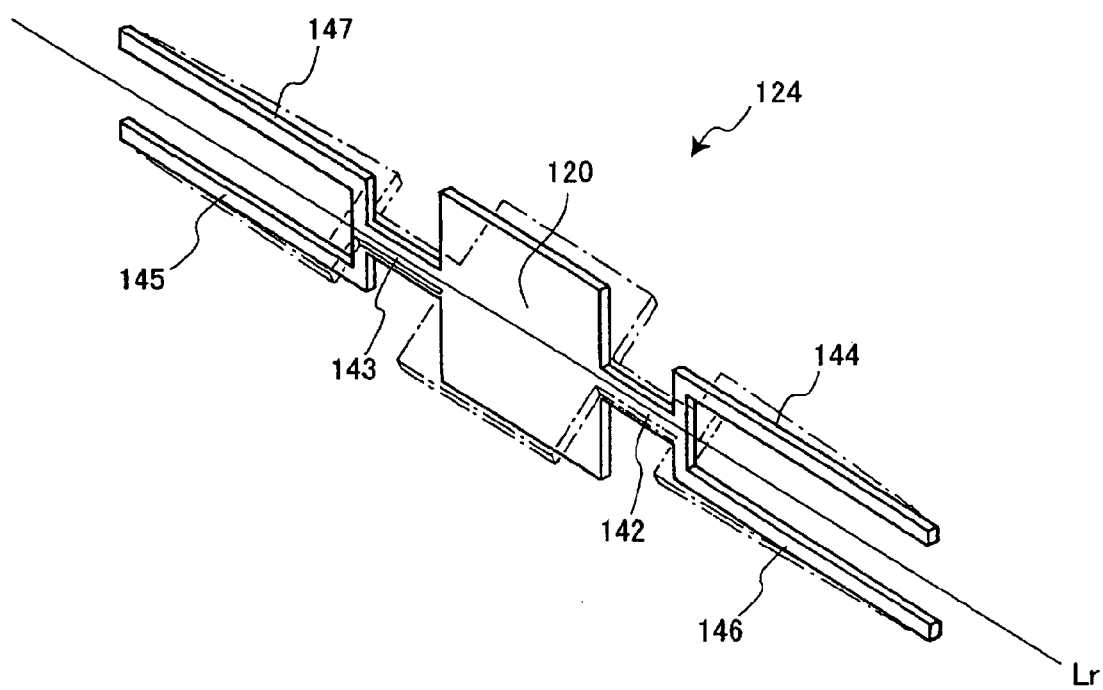
FIG. 3 is a view for explaining rotational oscillation of an oscillation body.

In FIG. 3, a solid line indicates positions of the first beam portion 140, the second beam portion 141 and the deflection surface 120 when a voltage is not applied to the first piezoelectric element 150 and the second piezoelectric element 152. Further, a broken line indicates positions of the first beam portion 140, the second beam portion 141 and the deflection surface 120 when an AC voltage is applied to the first piezoelectric element 150 and the second piezoelectric element 152 at a certain voltage.

Here, the fourth piezoelectric element 153 is fixedly secured to the resilient member 147 of the second beam portion 141. When such bending oscillations as described above are generated in the resilient member 147, the bending oscillations are converted into a voltage by the fourth piezoelectric element 153 and a voltage signal corresponding to a twisting quantity of the resilient member 147 (hereinafter referred to as "displacement signal Swsig(+)") is outputted from the output terminals 166, 167. Further, in the same manner, the third piezoelectric element 151 is fixedly secured to the resilient member 145 of the second beam portion 141. When such bending oscillations as described above are generated in the resilient member 145, the bending oscillations are converted into a voltage by the third piezoelectric element 151 and a voltage signal corresponding to a twisting quantity of the resilient member 145 (hereinafter referred to as "displacement signal Swsig(−)") is outputted from the output terminals 162, 163. Here, a second piezoelectric element portion is constituted of the third piezoelectric element 151 and the fourth piezoelectric element 153. Further, a displacement signal generator is constituted of the second piezoelectric element portion and the above-mentioned second beam portion 141.

With the use of the third piezoelectric element 151 and the fourth piezoelectric element 153 in this manner, the displacement signal corresponding to the twisting quantity of the second beam portion 141 can be generated and hence, a light beam detector which detects the displacements of the deflection surface 120 becomes unnecessary whereby it is possible to miniaturize the device. That is, the displacement signal indicating oscillation displacement of the deflection surface 120 of the resonance-type deflection element is taken out from the third piezoelectric element 151 and the fourth piezoelectric element 153.

[3. Constitution and Manner of Operation of Signal Processing Circuit]

Figure 4:
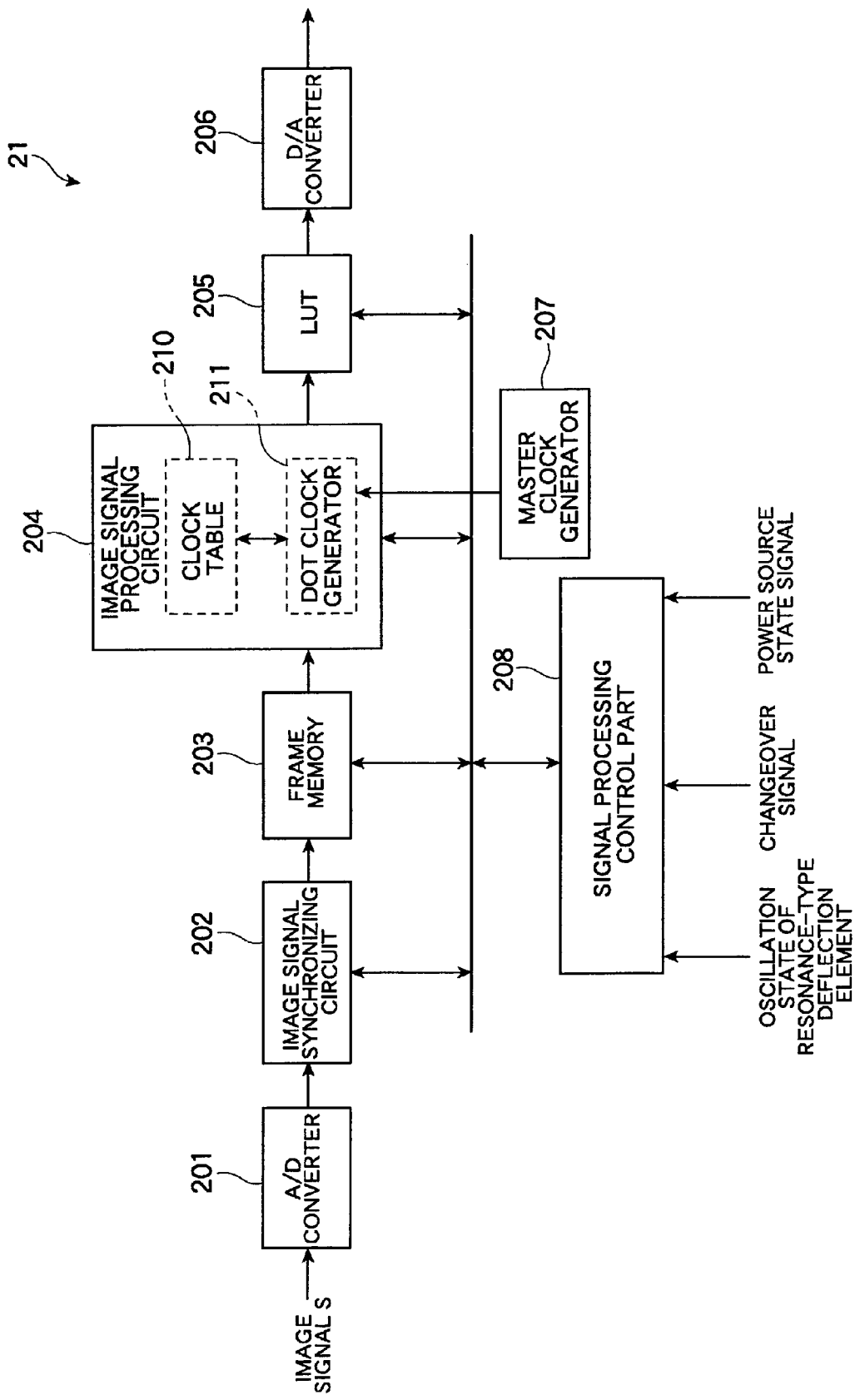
FIG. 4 is a view showing the constitution of a portion of a signal processing circuit shown in FIG. 1.

Next, the constitution of the signal processing circuit 21 which constitutes the technical feature of the present invention is specifically explained in conjunction with drawings. FIG. 4 is a schematic view showing the constitution of a portion of the signal processing circuit 21 which outputs image signals (B, R, G) 22a to 22c based on the image signal S.

As shown in FIG. 4, the signal processing circuit 21 includes an A/D converter 201 which digitalizes the image signal S, an image signal synchronizing circuit 202 which synchronizes the digitalized image signal S, a frame memory 203 which stores the image signal outputted from the image signal synchronizing circuit 202 per frame, a pixel signal processing circuit 204 which generates dot clocks having a clock cycle corresponding to pixel positions of an image to be displayed, reads the image signal stored in the frame memory 203 for every dot clock per pixel and generates pixel signals for respective colors (B, R, G), a lookup table 205 which constitutes a brightness table for adjusting a brightness of the image signals for respective colors outputted from the pixel signal processing circuit 204, a D/A converter 206 which converts the pixel signals for respective colors whose brightnesses are adjusted by the lookup table 205 into analogue signals and outputs the image signals as image signals (B, R, G) 22a to 22c, a master clock generator 207 which generates master clocks constituting basic clocks of the signal processing circuit 21, and a signal processing control part 208 which controls the whole signal processing circuit 21.

The pixel signal processing circuit 204 includes a clock table 210 which sequentially stores the number of master clocks corresponding to the clock cycles of the dot clocks corresponding to the scanning directions of the optical flux in the horizontal direction, in other words, scanning positions of the optical flux sequentially for every dot clock from the dot clock at a scanning start position of the optical flux to the dot clock at a scanning end position of the optical flux, and a dot clock generator 211 which, based on the clock table 210, generates dot clocks having clock cycles corresponding to the scanning directions of the optical flux using the resonance-type deflection element 71 by dividing the frequency of the master clocks.

Figure 6:
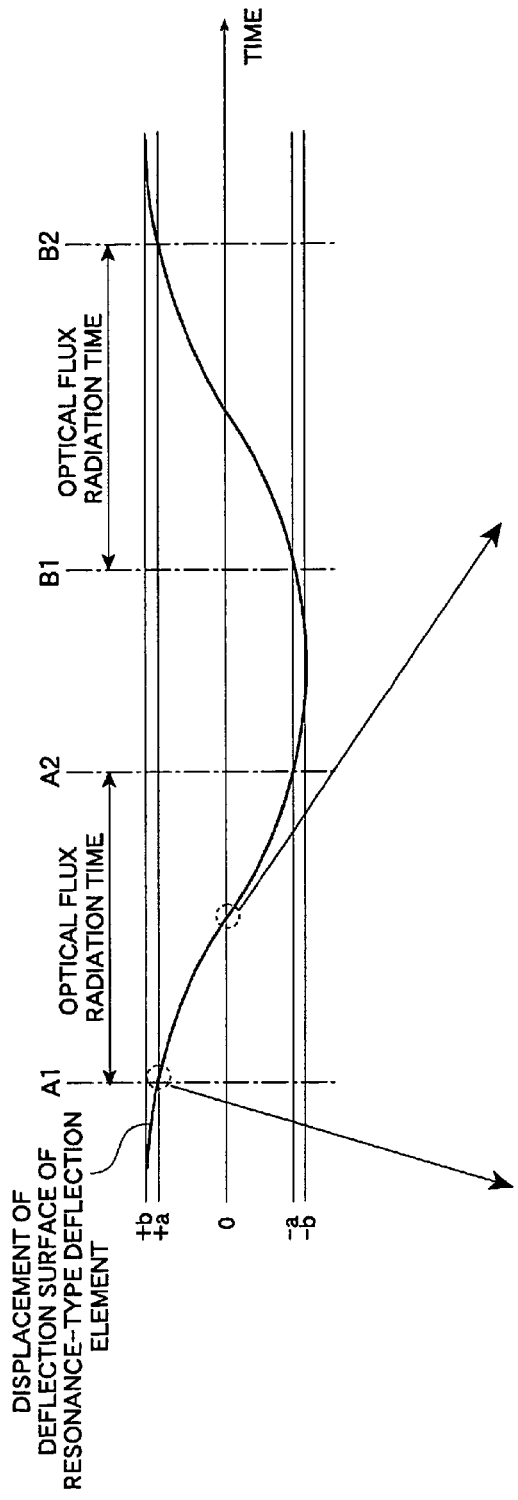
FIG. 6 is a view showing the relationship between a dot clock generated using the clock table, a master clock and a pixel signal.
Figure 6:
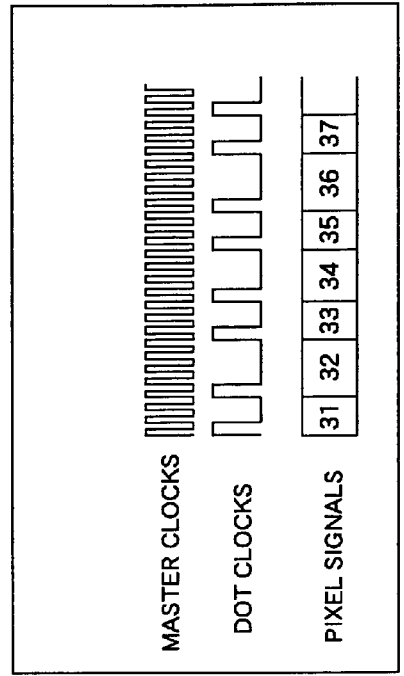
Figure 6:
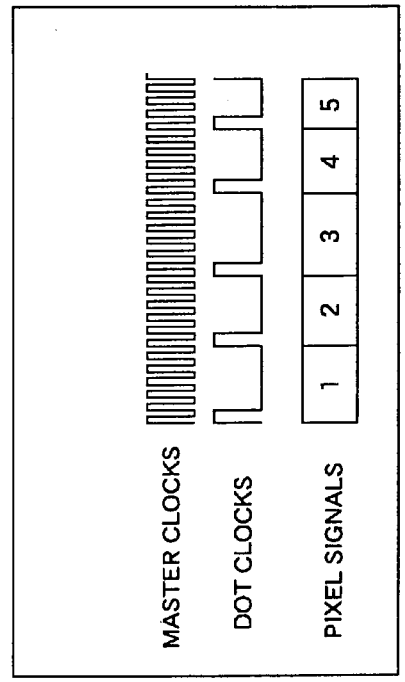

Here, the clock table 210 is explained specifically. FIG. 5 is a view showing an example of a clock table of this embodiment, FIG. 6 is a view showing the relationship between the dot clocks and the master clocks generated based on the clock table 210 shown in FIG. 5 and the pixel signal, and FIG. 7 is view for explaining a method of forming the clock table shown in FIG. 5.

As shown in FIG. 5, the clock table 210 is a clock table which sequentially stores the number of master clocks corresponding to the clock cycle (number of divided master clock frequencies) for every dot clock from the dot clock at the optical flux scanning start position.

The dot clock generator 211 generates the dot clock for reading a pixel signal for every pixel by dividing the master clocks by reference with the clock table 210. The clock table 210 is a clock table of an example in which 60 pixels are arranged in the horizontal direction, wherein the numbers of 1 to 60 are sequentially allocated to the pixels ranging from the pixel at the optical flux scanning start position to the pixel at the optical flux scanning finishing position in order of the dot clocks.

In the clock table 210 shown in FIG. 5, the number of master clocks is set to "6", "5", ..., "5", "6" in order from the dot clock number 1 to the dot clock number 60. The dot clock generator 211 generates the dot clocks having the clock cycle in which the number of master clocks is set to "6", "5", "5", "6" in order from the optical flux scanning start position. That is, the dot clock generator 211 generates the dot clocks having the clock cycle corresponding to the scanning direction of the optical flux based on the clock table 210.

FIG. 6 shows the relationship among the dot clocks, the master clocks and the pixel signals from the dot clock number 1 to the dot clock number 5, and the relationship among the dot clocks, the master clocks and the pixel signals from the dot clock number 31 to the dot clock number 37.

The optical flux from the light source part 30 is radiated when the displacement position of the deflection surface 120 of the resonance-type deflection element 71 falls within a range from +a to −a. In the image display device 1 of this embodiment, the flux from the light source part 30 is configured to radiate the optical flux when the deflection surface 120 of the resonance-type deflection element 71 falls within a range from +a to −a (timing from A1 to A2) and a range from −a to +a (timing from B1 to B2).

Here, the scanning start position of the optical flux means timing A1 or B1 at which the optical flux is radiated from the light source part 30.

As shown in FIG. 6, in the clock cycle of the dot clock number 1, the number of master clocks is 6. During this clock cycle, the pixel signal at the first pixel position (pixel number 1) is read by the image signal processing circuit 204 and is outputted to the light source part 30. Further, in the clock cycle of the dot clock number 31, the number of master clocks is 3. During this clock cycle, the pixel signal at the 31st pixel position (pixel number 31) in the horizontal direction is read by the image signal processing circuit 204 and is outputted to the light source part 30.

Here, the relationship between the clock cycles of dot clocks and the number of master clocks in the clock table 210 is explained in conjunction with FIG. 7. In FIG. 7, only the relationship with respect to the dot clock numbers 1 to 30 is shown and the relationship with respect to the dot clock numbers 31 to 60 is omitted.

Further, in this embodiment, the explanation is made by setting the resonance frequency of the resonance-type deflection element 71 to 30 KHz, the number of pixels in the horizontal direction to 60 dots, the frequency of the master clocks to 24 MHz, an effective time to 60%, an effective width (a rate of oscillation scanning range +a to −a with respect to a total oscillation range b to −b of the deflection surface 120) to 80.9%, and the number of master clocks in the radiation period of the optical flux in the horizontal direction to 240 dots. Further, the explanation is made assuming that the displacement of the deflection surface 120 draws a sinusoidal wave.

FIG. 7 shows amplitude (%) of the deflection surface 120 at an intermediate position between a radiation start position and a radiation finish position of the optical flux for every dot clock which allows scanning such that the scanning directions of the respective pixels are arranged at equal intervals. Further, FIG. 7 also shows an oscillation angle (rad) corresponding to the position of the deflection surface 120 at such an amplitude (%), a speed (assuming a speed of the fastest clock number 30 as 1), and an inverse number of the speed (corresponding to a movement time of the deflection surface 120) at such amplitude (%).

Then, the total of the inverse numbers of the speeds (the total of the inverse numbers ranging from the dot clock numbers 1 to 60 and being approximately 70.46 here) is calculated by dividing the radiation period of the optical flux in the horizontal direction with the number of master clocks (here, 240). This value becomes the number of master clocks (including decimal points) corresponding to the clock cycle of the dot clocks as a theoretical value at the fastest clock number 30. Hereinafter, this number of master clocks is referred to as a reference value. Here, the clock cycle of the dot clocks which constitutes the theoretical value is a clock cycle which makes the optical fluxes corresponding to each dot at equal intervals. That is, the clock cycle of the dot clock is an ideal clock cycle of dot clocks for arranging the center positions of the optical fluxes corresponding to the respective pixels (dots) in the scanning direction of the optical fluxes at equal intervals.

Accordingly, the clock cycle of the dot clock which constitutes the theoretical value with respect to every dot clock number becomes a value obtained by multiplying the above-mentioned reference value (hereinafter, referred to as a dot theoretical value) with the corresponding inverse number of the corresponding speed, and assumes a value shown in FIG. 7. In FIG. 7, all digits to the right of the second decimal point are omitted.

Further, the dot theoretical values are cumulatively added in order from the dot clock number 1. A value which is obtained by cumulatively adding theoretical values is referred to as a cumulative dot theoretical value. In FIG. 7, the cumulative dot theoretical values which are obtained by cumulatively adding the dot theoretical values are shown in order of the dot clock numbers.

After performing the above-mentioned calculation, the number of master clocks corresponding to the clock cycle of the actually-used dot clock (hereinafter, referred to as "dot correction value") is calculated. The dot correction values are cumulatively added in order from the dot clock number 1. A value which is obtained by cumulatively adding the dot correction values in this manner is referred to as a cumulative dot correction value. In FIG. 7, the cumulative dot correction values which are obtained by cumulatively adding the dot correction values in order of the dot clock numbers are shown.

Here, the dot correction values are calculated as follows.

First of all, the cumulative dot correction values are obtained by rounding the decimal points or less of the cumulative theoretical values. Next, the respective dot correction values are obtained based on the cumulative dot correction value. That is, from the cumulative dot correction value corresponding to the dot clock number for which the dot correction value is obtained, the cumulative dot correction value corresponding to the dot clock number preceding such a dot clock number by one is subtracted to obtain the dot correction value. Here, when the difference between the dot correction values of the dot clock numbers adjacent to each other in row has the difference of 2 master clocks, the dot correction value which is an average of both dot correction values is adopted.

By calculating the dot correction values as described above, respective conditions described hereinafter are satisfied. Here, provided that the following conditions are satisfied, the dot correction values may be calculated by methods other than the above-mentioned method.

(First Condition)

The difference between the dot correction value and the dot theoretical value must be 1 master clock or less. That is, the clock cycle of the actually-used dot clock must exhibit an error equal to or less than 1 cycle of the master clock with respect to the clock cycle of the dot clock which constitutes the theoretical value.

(Second Condition)

The error between the dot clock and the dot clocks around the former dot clock must be equal to or less than 1 master clock. That is, the cycle differences between the clock cycle of the actually-used dot clock and the dot clock cycles of the preceding and succeeding dot clocks must become errors equal to or less than 1 cycle of the master clock.

(Third Condition)

The error between the corrected dot cumulative value and the theoretical dot cumulative value is 1 master clock or less. That is, the error between the number of master clocks which is obtained by cumulatively adding the dot clocks ranging from the dot clock corresponding to the scanning start position of the optical flux (dot clock of dot clock number 1) to the dot clock to be generated and the number of master clocks which constitutes the theoretical value and is obtained by cumulatively adding dot clocks which constitute theoretical values corresponding to the dot clocks ranging from the dot clock corresponding to the scanning start position of the optical flux to the dot clock to be generated is 1 or less.

In this manner, the dot clock generator 211 is configured to generate the dot clocks having clock cycles corresponding to the scanning directions of the optical flux by dividing the frequency of the master clocks based on the clock table 210 and hence, the optical flux can be scanned such that the scanning directions of the pixels are arranged at equal intervals.

Here, the dot correction values which satisfy the following fourth condition in addition to the above-mentioned first to third conditions may be calculated.

(Fourth Condition)

The clock cycles of the dot clocks must have the same cycle or more ranging from the center of the oscillation range (dot clock numbers 30,31) to the peripheries (dot clock numbers 1,60) of the deflection surface 120. In other words, the clock cycles of the neighboring dot clocks must have the same cycle or more ranging from the center of the oscillation range (dot clock numbers 30,31) to the periphery (dot clock numbers 1,60) of the deflection surface 120. That is, the dot correction value is prevented from becoming smaller from the dot clock number 30 to the dot clock number 1 or from the dot clock number 31 to the dot clock number 60.

By adopting the dot correction values which satisfy the fourth condition, there is no possibility that the clock cycle of the dot clocks at a center portion of an image displayed by the image display device 1 fluctuate and hence, the image quality of an image displayed by the image display device 1 can be enhanced.

Here, in this embodiment, a plurality of clock tables 210 are provided corresponding to the resonance frequencies of the resonance-type deflection element 71 and the oscillation ranges of the deflection surface 120. That is, the clock tables 210 are provided corresponding to the respective resonance frequencies of the resonance-type deflection elements 71 and the oscillation ranges of the deflection surfaces 120.

Then, the dot clock generator 211 picks up the clock table 210 corresponding the resonance frequency of the resonance-type deflection element 71 and the oscillation range of the deflection surface 120, and generates the dot clock having the clock cycle corresponding to the clock table 210.

Accordingly, even when the resonance frequency of the resonance-type deflection element 71 is deviated or the oscillation range of the deflection surface 120 is changed due to a temperature change or a lapse of time, the dot clock having a proper clock cycle can be generated thus enhancing the quality of image displayed by the image display device 1. Further, the present invention can cope with the irregularities of characteristics (individual differences) for every manufacturing lot of the resonance-type deflection element 71.

The dot clock generator 211 selects one clock table 210 from the plurality of these clock tables 210 and generates the dot clock based on the selected clock table 210.

The selection of the clock table 210 is performed in response to a displacement signal outputted from the displacement signal generator of the resonance-type deflection element 71 corresponding to the oscillation of the deflection surface 120 of the resonance-type deflection element 71. That is, the oscillation state detector 73 detects the oscillation range and the oscillation frequency oscillation state of the deflection surface 120 in response to a displacement signal outputted from the displacement signal generator, and the dot clock generator 211 selects the clock table 210 corresponding to the detected oscillation state.

Here, the timing at which the dot clock generator 211 changes over the selection of the clock table 210 is explained. In this embodiment, based on a detection result of the power source state detecting part 26, the detection result of the temperature detecting part 74 or the like, the selection timing of the clock table 210 is set. The selection timing of the clock table 210 is, in other words, the detection timing of the oscillation state of deflection surface 120 such as the oscillation range or the oscillation frequency.

That is, as described previously, the image display device 1 includes the power source state detecting part 26 which detects a state of a power source for operating at least the optical flux generating part 20, and the selection timing of the clock table 210 is set at a point of time that it is detected that the power source of the power source state detecting part 26 is shifted to an ON state from an OFF state.

By selecting the clock table 210 at the time of operating the optical flux generating part 20, the quality of the image can be enhanced from a point of time that the operation is started and hence, the quality of image displayed by the image display device 1 can be enhanced.

Further, as described previously, the image display device 1 includes the temperature detecting part which detects a temperature of the resonance-type deflection element 71 or a temperature around the resonance-type deflection element 71 and is configured to set the selection timing of the clock table when a change of predetermined temperature or more is detected by the temperature detecting part 74.

When the change of predetermined temperature or more is detected with respect to the temperature of the resonance-type deflection element 71 or the temperature around the resonance-type deflection element 71, there exists high possibility that the oscillation state such as the oscillation range and the oscillation frequency of the resonance-type deflection element 71 is changed and hence, such a change is used as the selection timing of the clock table. Accordingly, the image display device 1 can properly cope with the change of the oscillation state such as the oscillation range and the oscillation frequency of the resonance-type deflection element 71 and hence, the deterioration of the quality of the image displayed by the image display device 1 can be suppressed.

Further, in this embodiment, in addition to the above-mentioned selection timing, timing at fixed intervals is also used as the selection timing of the clock table 210. Accordingly, even when the oscillation state such as the oscillation range and the oscillation frequency of the resonance-type deflection element 71 is changed due to the gentle change of the temperature of the resonance-type deflection element 71, it is possible to change over the clock table 210 at the fixed intervals and hence, the deterioration of the quality of the image displayed by the image display device 1 can be suppressed.

Further, in this embodiment, the clock table 210 used by the dot clock generator 211 can be selected by operating an inputting part 25 which constitutes the changeover means. Accordingly, a user (a viewer) of the image display device 1 can change over the clock table 210 by himself or herself when the quality of the image displayed by the image display device 1 is deteriorated whereby, for example, even when the oscillation state such as the oscillation range and the oscillation frequency of the resonance-type deflection element 71 is changed due to causes other than the temperature within the above-mentioned fixed time, the user can promptly cope with the change by operating the inputting part 25.

As described above, the brightness of the pixel signal read based on the dot clock generated by the dot clock generator 211 is adjusted by reference to the lookup table 205.

In the lookup table, as shown in FIG. 8, a brightness correction rate which assumes the brightness value corresponding to the clock cycle of the dot clock generated by the dot clock generator 211 is defined corresponding to the dot clock number. That is, the brightness information corresponding to the clock cycle of the dot clock is stored sequentially for every dot clock from the dot clock at the scanning start position of the optical flux.

The brightness correction rate is a value substantially equal to the inverse number of a speed of the resonance-type deflection element 71 shown in FIG. 7. Accordingly, a product obtained by multiplying the brightness correction rate with the speed of the resonance-type deflection element 71 always assumes 1.

Since the brightness of the pixel signal is adjusted by correcting the brightness of the pixel signal with the brightness correction rate of a value substantially equal to the inverse number of the speed of the resonance-type deflection element 71, any dot of the image displayed by the image display device 1 acquires the brightness distribution substantially equal to the brightness distribution of the original image. Accordingly, it is possible to suppress the generation of the brightness irregularities thus enhancing the quality of the image displayed by the image display device 1.

The lookup table 205 is provided corresponding to the clock table 210. That is, the lookup tables 205 which respectively correspond to the plurality of clock tables 210 are provided.

Further, in an interlocking manner with the above-mentioned selective changeover of the clock table 210, the lookup table 205 corresponding to the changed-over clock table 210 is selected.

Accordingly, even when the clock table 210 is changed over, the generation of the brightness irregularities can be suppressed and hence, the quality of the image of the image display device 1 can be enhanced.

As described above, according to the image display device 1 of this embodiment, with the use of the clock table 210 and the lookup table 205, the high image quality can be maintained while constituting the optical scanning device without using the arc sin θ correction lens.

Second Embodiment

In the image display device of the first embodiment, the dot clocks are generated using the clock table 210. In the second embodiment, however, the dot clocks are generated by arithmetic calculation processing without using the clock table 210.

The image display device of the second embodiment differs, as shown in FIG. 9, from the image display device of the first embodiment only with respect to the constitution of the pixel signal circuit and hence, the explanation of other parts is omitted here.

As shown in FIG. 9, a dot clock generator 211 of an image signal processing circuit 204' includes a clock cycle theoretical value calculation part 211a and a cumulative addition value differential detecting part 211b, and generates dot clocks having clock cycles based on arithmetic calculation results from these parts.

The clock cycle theoretical value calculation part 211a calculates, based on an oscillation state such as an oscillation range or oscillation frequency of a deflection surface 120 of the resonance deflection element 71 detected by an oscillation state detector 73, the number of master clocks corresponding to the clock cycle of the dot clock which constitutes a theoretical value for every dot clock.

Further, the cumulative addition value differential detecting part 211b calculates a differential between the number of master clocks which is obtained by cumulatively adding the dot clocks from the dot clock corresponding to the scanning start position of the optical flux to the dot clock corresponding to the scanning finish position to be generated and the number of master clocks which constitutes a theoretical value and is obtained by cumulatively adding the dot clocks which constitute theoretical values corresponding to dot clocks from the dot clock corresponding to the scanning start position of the optical flux to the dot clock corresponding to the scanning finish position of the optical flux.

The dot clock generator 211 generates the dot clocks having the clock cycles which satisfy the above-mentioned first to third conditions using the clock cycle theoretical value calculation part 211*a* and the cumulative addition value differential detecting part 211*b*.

In this manner, according to the image display device of the second embodiment, the dot clocks which correspond to the oscillation states such as the oscillation ranges or the oscillation frequencies of the deflection surface 120 of the resonance-type deflection element 71 can be generated without using the clock table and hence, the quality of the image displayed by the image display device can be further enhanced.

Although some embodiments of the present invention have been explained in detail heretofore in conjunction with drawings, these are provided merely for an illustration purpose, and the present invention can be carried out in other modes to which various modifications and variations are applied based on knowledge of those who are skilled in the art.

For example, the master clock generator 207 may be exchangeably constituted. That is, the master clock generator 207 may be mounted on the optical flux generating part 20 by connecting the master clock generator 207 and the optical flux generating part 20 using a detachable connector or the like. By adopting such constitution, it is possible to mount the master clock generator 207 which conforms to the resonance frequency and the oscillation range of the resonance-type deflection element 71 and hence, the number of the above-mentioned clock tables can be decreased as much as possible. As a result, an occupying rate of a memory region relating to the clock tables can be lowered. Further, by decreasing the number of the clock tables to 1, the table selection processing becomes unnecessary thus realizing the reduction of the development cost.

What is claimed is:

1. An optical scanning device comprising:
    an optical flux generator which generates an optical flux in response to an image signal read for every dot clock and radiates the optical flux;
    a resonance-type deflection element which has a deflection surface for scanning the optical flux; and
    a drive signal generator which generates a drive signal for oscillating the resonance-type deflection element in a resonance state, wherein,
    the optical scanning device further includes a dot clock generator which generates dot clocks having clock cycles corresponding to the scanning directions of the optical flux by dividing master clocks which constitute basic clocks,
    the dot clock generator is configured to sequentially generate the dot clocks which satisfy
    a first condition that the clock cycle of the actually-used dot clock corresponding to the scanning direction of the optical flux exhibits an error equal to or less than 1 cycle of the master clock with respect to the clock cycle of the dot clock which constitutes a theoretical value such that optical fluxes corresponding to respective dots are arranged at equal intervals,
    a second condition that the cycle differences between the clock cycle of the actually-used dot clock corresponding to the scanning direction of the optical flux and the clock cycles of the preceding and succeeding dot clocks become errors equal to or less than 1 cycle of the master clock, and
    a third condition that an error between the number of the master clocks which is acquired by cumulatively adding the dot clocks from the dot clock corresponding to a scanning start position of the optical flux to the dot clock to be generated, and the number of the master clocks which constitutes a theoretical value and is acquired by cumulatively adding dot clocks which constitute the theoretical values corresponding to the dot clocks from the dot clock corresponding to the scanning start position of the optical flux to the dot clock to be generated becomes equal to or less than 1 cycle of the master clock, and
    the optical flux generator radiates the optical fluxes having brightnesses corresponding to the clock cycles of the dot clocks generated by the dot clock generator.

2. An optical scanning device according to claim 1, wherein the dot clock generator generates the dot clocks which satisfy a fourth condition that the clock cycles of the dot clocks become the same cycle or more from the center of an oscillation range on the deflection surface to peripheries of the deflection surface.

3. An optical scanning device according to claim 1, wherein the optical scanning device includes a clock table which sequentially stores the number of master clocks corresponding to clock cycles which satisfy the respective conditions for the respective dot clocks from the dot clock at the scanning start position of the optical flux, and a brightness table which sequentially stores brightness information corresponding to the clock cycles of the dot clocks for the respective dot clocks from the dot clock at the scanning start position of the optical flux.

4. An optical scanning device according to claim 3, wherein the optical scanning device includes a plurality of clock tables and a plurality of brightness tables respectively,
    the optical scanning device further includes a displacement signal generator which generates a displacement signal corresponding to the oscillation of the deflection surface, and an oscillation state detector which detects an oscillation state of the deflection surface in response to the displacement signal,
    the dot clock generator selects the clock table corresponding to the oscillation state of the deflection surface out of the plurality of clock tables and generates the dot clock, and
    the optical flux generator selects the brightness table corresponding to the oscillation state of the deflection surface out of the plurality of brightness tables, and radiates the optical flux having the brightness corresponding to the clock cycle of the dot clock generated by the dot clock generator.

5. An optical scanning device according to claim 4, wherein the optical scanning device includes a power source state detecting part which detects a state of a power source for operating at least the optical flux generator, and
    the oscillation state detector detects the oscillation state of the deflection surface in response to the detection of shifting of the power source from an OFF state to an ON state by the power source state detecting part.

6. An optical scanning device according to claim 4, wherein the detection of the oscillation state of the deflection surface by the oscillation state detector is performed at fixed intervals.

7. An optical scanning device according to claim 4, wherein the optical scanning device includes a temperature detecting part which detects a temperature of the resonance-type deflection element or a temperature around the resonance-type deflection element, and
    the oscillation state detector detects an oscillation state of the deflection surface in response to the detection of a change of a predetermined temperature or more by the temperature detecting part.

8. An optical scanning device according to claim 4, wherein
the resonance-type deflection element includes a first beam portion which is connected to one side of the deflection surface which reflects an incident light, and a first piezoelectric element portion which is configured to resiliently deform the first beam portion, and
the displacement signal generator includes a second beam portion which is connected to another side of the deflection surface and is displaced in response to the oscillations of the first beam portion, and a second piezoelectric element portion which generates a displacement signal in response to the displacement of the second beam portion.

9. An optical scanning device according to claim 3, wherein the optical scanning device includes a plurality of clock tables and a plurality of brightness tables respectively, and a changeover unit which changes over the clock tables and the brightness tables,
the dot clock generator generates the dot clock using the clock table changed over by the changeover unit, and
the optical flux generator radiates the optical flux having brightness corresponding to the clock cycle of the dot clock generated by the dot clock generator using the brightness table changed over by the changeover unit.

10. An optical scanning device according to claim 1, wherein
the optical scanning device includes a displacement signal generator which generates a displacement signal corresponding to the oscillation of the deflection surface, and an oscillation state detector which detects an oscillation state of the deflection surface in response to the displacement signal,
the dot clock generator includes:
a clock cycle theoretical value calculating part which calculates the number of master clocks corresponding to the clock cycle of the dot clock which constitutes the theoretical value for every dot clock based on the oscillation state of the deflection surface detected in response to the displacement signal, and
a cumulative added value difference detecting part which calculates the difference between the number of the master clocks which is obtained by cumulatively adding the dot clocks from the dot clock corresponding to the scanning start position of the optical flux to the dot clock to be generated and the number of master clocks which constitutes a theoretical value and is obtained by cumulatively adding the dot clocks which constitute the theoretical values corresponding to the dot clocks from the dot clock corresponding to the scanning start position of the optical flux to the dot clock to be generated, and
the dot clock generator generates the dot clocks having clock cycles which satisfy the first condition to the third condition based on the calculation results of the clock cycle theoretical value calculating part and the cumulative added value difference detecting part.

11. An image display device including an optical scanning device and displaying an image by scanning an optical flux modulated in response to an image signal by the optical scanning device, the optical scanning device comprising:
an optical flux generator which generates an optical flux in response to an image signal read for every dot clock and radiates the optical flux;
a resonance-type deflection element which has a deflection surface for scanning the optical flux; and
a drive signal generator which generates a drive signal for oscillating the resonance-type deflection element in a resonance state, wherein,
the optical scanning device further includes a dot clock generator which generates dot clocks having clock cycles corresponding to the scanning directions of the optical flux by dividing master clocks which constitute basic clocks,
the dot clock generator is configured to sequentially generate the dot clocks which satisfy
a first condition that the clock cycle of the actually-used dot clock corresponding to the scanning direction of the optical flux exhibits an error equal to or less than 1 cycle of the master clock with respect to the clock cycle of the dot clock which constitutes a theoretical value such that optical fluxes corresponding to respective dots are arranged at equal intervals,
a second condition that the cycle differences between the clock cycle of the actually-used dot clock corresponding to the scanning direction of the optical flux and the clock cycles of the preceding and succeeding dot clocks become errors equal to or less than 1 cycle of the master clock, and
a third condition that an error between the number of the master clocks which is acquired by cumulatively adding the dot clocks from the dot clock corresponding to a scanning start position of the optical flux to the dot clock to be generated, and the number of the master clocks which constitutes a theoretical value and is acquired by cumulatively adding dot clocks which constitute the theoretical values corresponding to the dot clocks from the dot clock corresponding to the scanning start position of the optical flux to the dot clock to be generated becomes equal to or less than 1 cycle of the master clock, and
the optical flux generator radiates the optical fluxes having brightnesses corresponding to the clock cycles of the dot clocks generated by the dot clock generator.

12. A retinal scanning display including an optical scanning device and displaying an image on a retina of an eye by projection by scanning an optical flux modulated in response to an image signal by the optical scanning device, the optical scanning device comprising:
an optical flux generator which generates an optical flux in response to an image signal read for every dot clock and radiates the optical flux;
a resonance-type deflection element which has a deflection surface for scanning the optical flux; and
a drive signal generator which generates a drive signal for oscillating the resonance-type deflection element in a resonance state, wherein,
the optical scanning device further includes a dot clock generator which generates dot clocks having clock cycles corresponding to the scanning directions of the optical flux by dividing master clocks which constitute basic clocks,
the dot clock generator is configured to sequentially generate the dot clocks which satisfy
a first condition that the clock cycle of the actually-used dot clock corresponding to the scanning direction of the optical flux exhibits an error equal to or less than 1 cycle of the master clock with respect to the clock cycle of the dot clock which constitutes a theoretical value such that optical fluxes corresponding to respective dots are arranged at equal intervals,
a second condition that the cycle differences between the clock cycle of the actually-used dot clock corresponding to the scanning direction of the optical flux and the clock cycles of the preceding and succeeding dot clocks become errors equal to or less than 1 cycle of the master clock, and a third condition that an error between the number of the master clocks which is acquired by cumulatively adding the dot clocks from the dot clock corresponding to a scanning start position of the optical flux to the dot clock to be generated, and the number of the master clocks which constitutes a theoretical value and is acquired by cumulatively adding dot clocks which constitute the theoretical values corresponding to the dot clocks from the dot clock corresponding to the scanning start position of the optical flux to the dot clock to be generated becomes equal to or less than 1 cycle of the master clock, and the optical flux generator radiates the optical fluxes having brightnesses corresponding to the clock cycles of the dot clocks generated by the dot clock generator.

13. A method of generating an optical flux in an optical scanning device which includes an optical flux generator which generates an optical flux in response to an image signal read for every dot clock and radiates the optical flux; a resonance-type deflection element which has a deflection surface for scanning the optical flux; and a drive signal generator which generates a drive signal for oscillating the resonance-type deflection element in a resonance state, the method of generating the optical flux comprising the steps of:

generating dot clocks having clock cycles corresponding to the scanning directions of the optical fluxes by dividing master clocks which constitute basic clocks;

sequentially generating the dot clocks which satisfy a first condition that the clock cycle of the actually-used dot clock corresponding to the scanning direction of the optical flux exhibits an error equal to or less than 1 cycle of the master clock with respect to the clock cycle of the dot clock which constitutes a theoretical value such that optical fluxes corresponding to the respective dots are arranged at equal intervals, a second condition that the cycle differences between the clock cycle of the actually-used dot clock corresponding to the scanning direction of the optical flux and the clock cycles of the preceding and succeeding dot clocks become errors equal to or less than 1 cycle of the master clock, and a third condition that an error between the number of the master clocks which is acquired by cumulatively adding the dot clocks from the dot clock corresponding to a scanning start position of the optical flux to the dot clock to be generated and the number of the master clocks which constitutes a theoretical value and is acquired by cumulatively adding dot clocks which constitute the theoretical values corresponding to the dot clocks from the dot clock corresponding to the scanning start position of the optical flux to the dot clock to be generated becomes equal to or less than 1 cycle of the master clock; and radiating an optical flux having brightness corresponding to the clock cycle of the generated dot clock.

* * * * *